Dec. 21, 1965 R. F. TURNER ETAL 3,224,944
CERAMIC-MATRIX-TYPE FUEL ELEMENT WITH GRAPHITE
FABRIC AFFIXED TO EXTERIOR SURFACE
Filed May 5, 1964
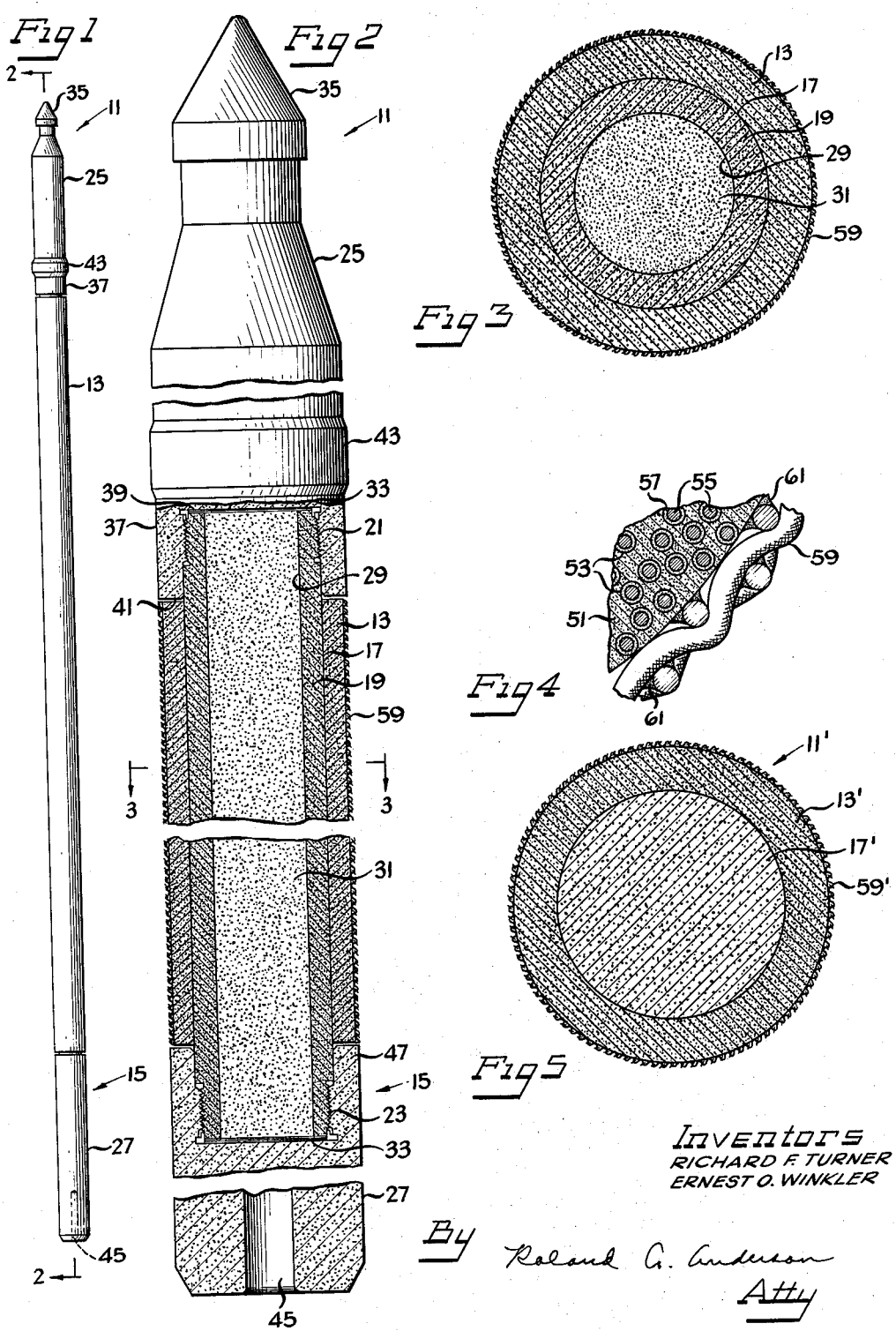
Inventors
RICHARD F. TURNER
ERNEST O. WINKLER
By Roland G. Anderson
Atty United States Patent Office 3,224,944
Patented Dec. 21, 1965

3,224,944
CERAMIC-MATRIX-TYPE FUEL ELEMENT WITH GRAPHITE FABRIC AFFIXED TO EXTERIOR SURFACE
Richard F. Turner and Ernest O. Winkler, both of San Diego, Calif., assignors, by mesne assignments, to the United States of America as represented by the United States Atomic Energy Commission
Filed May 5, 1964, Ser. No. 365,224
7 Claims. (Cl. 176—69)

The invention relates to fuel elements for nuclear reactors and more particularly to fuel elements especially suited for use in high temperature gas-cooled reactors.

In reactors which operate at high power levels and which utilize a fluid coolant stream to extract heat from fuel elements positioned in a reactor core, it is important to obtain efficient heat transfer from the fuel elements to the coolant stream. The more efficient heat transfer characteristics a fuel element has, the lower the actual fuel temperature need be maintained to transfer a given quantum of heat per unit time to the coolant stream. Lower fuel temperatures provide longer fuel life. Moreover, more efficient heat transfer alternately allows utilization of smaller fuel elements to transfer a required amount of heat to the coolant stream per fuel element. Accordingly, new fuel elements are continually being designed in attempts to improve heat transfer efficiency.

In reactors operating at high power levels, relatively large quantities of fission products are produced which should be desirably kept out of the main coolant stream. Because of provisions which have been made for the containment of fission products in gas-cooled power reactors, the heat transfer characteristics of fuel elements have been less than ideal. Fuel elements for these reactors have incorporated various types of purging systems wherein a small fraction of the gas coolant flow has been diverted from the main coolant stream and directed through the fuel elements in order to establish a purge flow through each fuel element that would carry fission products to suitable traps. Such purge systems have necessarily added to the expense of the fuel elements and of the associated reactors.

It is an object of the present invention to provide an improved fuel element for use in a nuclear reactor. It is a more particular object to provide improved fuel elements for high temperature gas-cooled reactors. It is another object to provide a fuel element having improved heat-transfer characteristics. It is a still further object to provide a fuel element for a high temperature gas-cooled reactor which does not require a purging system to keep the coolant stream free from undesirable fission products. It is another object to provide a fuel element which is simple in construction and which can be inexpensively manufactured. These and other objects of the invention are more particularly set forth in the following detailed description and in the accompanying drawings wherein:

FIGURE 1 is an elevational view of a fuel element embodying various of the features of the invention;

FIGURE 2 is an enlarged view of the fuel element shown in FIGURE 1, generally in section along line 2—2 of FIGURE 1;

FIGURE 3 is an enlarged sectional view taken along the line 3—3 of FIGURE 2;

FIGURE 4 is an enlarged fragmentary view of FIGURE 3 showing the area at the outer surface of the fuel element; and FIGURE 5 is a view similar to FIGURE 3 illustrating an alternate embodiment of the invention.

Generally, the invention provides a fuel element 11 for a nuclear reactor which comprises an elongated outer fuel body 13 of graphite which has dispersed therein discrete particles of nuclear fuel and supporting means 15 connected to the fuel body 13 for supporting the fuel body in the core of a nuclear reactor. The fuel body 13 is disposed so its outer surface is in direct contact with the reactor coolant stream reducing heat loss in travel to the heat transfer surface. Fuel in particle form, disposed within a supporting matrix, is utilized; the particles have excellent fission product-containment characteristics so that contamination of the coolant stream by fission products is not a problem. Treatment of the outer surface of the fuel body 13 to uniformly roughen its surface substantially improves the heat transfer between the fuel element 11 and the passing fluid coolant stream and further improves performance. Because no purging system need be incorporated into a fuel element of this type, which is adapted for use with a gaseous coolant, the fuel element 11 is capable of being relatively inexpensively constructed.

Referring now specifically to the drawings, the particular embodiment of the fuel element 11 shown in FIGURES 1 through 3 is of the type adapted for utilization in a high-temperature gas-cooled nuclear reactor, such as the reactor which is known as the HTGR (high temperature graphite reactor). This reactor is described in Nucleonics, volume 18, Number 1, pp. 86–90, published January 1960. The fuel element 11 comprises an outer annular fuel body 13 which is fitted over a supporting spine 17. The supporting spine 17 is formed of a tube 19 which serves as the main longitudinal structural member of the fuel element 11. The tube 19 has threads 21, 23 at its upper and lower extremities, respectively, by which the tube 19 is joined to a top reflector 25 and to a bottom connector 27, also parts of supporting means 15.

The fuel element spine 17 serves as part of the moderator for the fuel element 11 and may be made of any suitable material, such as graphite, which will retain its strength and dimensions under conditions of high temperature and irradiation. The tube 19, as shown in FIGURES 2 and 3, provides a central chamber 29 that can be filled with a moderator 31.

In the illustrated embodiment, the moderator 31 is formed of a bed of beryllium oxide powder. Pellets or a solid compact of beryllium oxide, or any other suitable material, may be used instead. A central core of beryllium oxide may be especially desirable in fuel elements containing fertile thorium material. To hold the bed of powder within the tube 19, covers 33 made from a suitable material, such as graphite cloth, are provided at each end of the tube.

Alternately, as shown in FIGURE 5, a fuel element 11' having an annular fuel body 13' can be made utilizing a solid cylindrical spine 17' made of a structurally strong moderating material, such as graphite. The spine 17' can be inexpensively manufactured by merely machining suitable threads upon the ends of a cylindrical piece of reactor grade graphite.

The top reflector 25 and bottom connector 27 both serve as a portion of the reflector of the reactor and, therefore, are made of a suitable structurally strong material which has a low neutron-absorption cross section and a high scattering cross section, such as graphite. The top reflector 25 can be of any suitable shape. The illustrated fuel element 11 is designed for use with fuel handling apparatus which includes a grappling device to transport the fuel elements within a reactor pressure vessel. The top reflector 25 is provided with a grappling head 35 to which the grappling device attaches. The top reflector 25, which can be machined from a cylindrical piece of reactor grade graphite, has at its lower end a sleeve section 37. The sleeve section 37 has internal threads which mate with the external threads 21 on the upper end of the spine 17. The cover 33, which retains the powdered moderator 31 in the central chamber 29, also serves as a gasket between the upper end face 39 of the tube 19 and the adjacent internal face of the top connector sleeve section 37.

To assure preservation of the desired spacing between fuel elements in the reactor core, the top reflector 25 also contains a spacing ring portion 43 which assures minimum spacing between adjacent fuel elements 11 in the reactor core. The spacing ring portion 43 may be provided by machining the top reflector 25 from a piece of graphite having the desired diameter for the spacing ring. It may also be provided by building up an enlarged region by applying green graphite and baking, or by any other suitable method. Additional spacing rings may be provided at locations along the fuel body if desired.

The bottom connector 27 contains a cavity 45 at the lower end and a sleeve section 47 at its upper end. The sleeve section 47 is similar in construction to the sleeve section 37 and contains internal threads which mate with the external threads 23 at the lower end of the tube 19. The cavity 45 is proportioned to receive a stand-off pin (not shown) upon which the fuel element 11 is designed to rest when in position in the reactor core.

The illustrated fuel body 13 is annular in configuration and comprises a graphite matrix 51 (see FIGURE 4) which has a plurality of particles 53 of nuclear fuel material generally uniformly dispersed therein. The particles 53 contain centers 55 of fissionable and/or fissionable and fertile materials, as for example, uranium oxides, uranium carbides, thorium oxides, thorium carbides, mixtures of uranium and thorium oxides or carbides, etc. Other suitable nuclear fuels may also be used. The centers 55 are preferably spherically shaped and are enclosed within individual, integral, outer jackets or coatings 57 which prevent the migration of fission products therethrough. The coatings 57 have a very high resistance to the migration of fission products and thereby prevent contamination of the coolant stream by radioactive fission products which would have a tendency to plate out in the steam generation sections of the reactor system. To keep the coolant contamination within the acceptable limits, the coatings 57 should retain within the confines of the fuel particles 53 at least about 99 percent of the fission products produced from the fissile material and, preferably, about 99.999 percent.

Fuel particles coated with any suitable ceramic materials, as for example, pyrolytic carbon, silicon carbide, aluminum oxide, zirconium carbide, etc., which meet the specifications set forth above can be used in making the annular fuel body 13. Preferably, the coatings 57 have a thickness of at least about 10 microns so as to obviate any problem of recoil damage to the graphite matrix 51 in which the particles 53 are disposed.

Particles 53 which are considered especially suitable for use in the fuel body 13 have been manufactured and sold by General Atomic Division of General Dynamics Corporation and are referred to as "triplex-coated" particles. "Triplex-coated" particles are more fully described in USAEC Report GA–4695, "Graphite-Matrix Fuels Development for the AVR," Chin et al., General Atomic Division of General Dynamics Corp., October 1963. These fuel particles contain three distinct layers of pyrolytic carbon which constitute coatings 57 inside of which the fissile and/or fertile material centers 55 are disposed. These coatings 57 comprise an inner layer of spongy carbon and outer layers of dense carbon. They can, for example, be made by the pyrolytic deposition of carbon from an atmosphere containing a partial pressure of a gaseous hydrocarbon, using a fluidized bed technique or any other suitable coating procedure. The innermost layer of spongy carbon is about 25 microns in thickness and can be deposited by heating a fluidized bed of particles in an acetylene-helium atmosphere at 1150° C. A layer of laminar carbon and a layer of columnar carbon complete the fuel particle coating 57. Either may be outermost. Laminar carbon may, for example, be deposited by using a temperature of about 1700° C. with a mixture of helium and methane gas. Columnar carbon may, for example, be deposited at a temperature 1850° C. from a gaseous mixture of methane gas using a fluidized bed technique.

Because fuel particles 53 are selected which have a very high retention of gaseous fission products, the graphite matrix 51 in which the particles are disposed is not relied upon to prevent the escape of gaseous fission products into the coolant stream. Therefore, neither the fuel-containing graphite matrix 51 nor any other graphite container need be specifically treated to reduce its permeability to gases to serve as a barrier to the passage of fission products into the coolant stream. The elimination of impregnated graphite from the fuel element lowers the production cost.

The annular fuel body 13 is disposed on the outside of the fuel element 11 where it is in direct contact with the coolant stream. This arrangement provides highly efficient heat transfer from the fuel element 11 to the coolant. Previous fuel elements that employed nuclear fuel within a graphite matrix disposed the fuel bodies within an impervious container, consequently separating the fuel body from the coolant stream by the thickness of the container wall. Moreover, such an arrangement inherently produced a gap between the outer surface of the fuel body and the adjacent inner surface of the impervious container, which gap caused another significant heat transfer loss.

The annular fuel body 13 can be produced in any suitable manner that can be used for making graphite bodies which are impregnated with nuclear fuel material. Preferably, the annular fuel body 13 is extruded from a mixture of graphite and nuclear fuel particles. Such a manufacturing process is inherently capable of producing annular graphite bodies of indefinite lengths and thus can be used to form the entire annular fuel body 13 as a single piece. However, such one-piece construction is not necessary. If, for manufacturing or handling conditions, it is more convenient to make the fuel body 13 in a plurality of sections, such a construction is also suitable because the sections may easily be stacked upon the fuel element spine 17. Likewise a plurality of pressed rings of fuel material are also acceptable, although manufacturing costs would conceivably be higher. Moreover, because the heat flow is outward to the outer surface of the fuel body 13, the tolerance between the inner diameter of the fuel body 13 and the outer diameter of the spine 17 need not be closely controlled.

Preferably, the annular fuel body 13 includes fuel particles in an amount of about 30% of its total volume. This figure depends upon the individual characteristics desired for the overall group of fuel elements that go into a reactor. Of course, fuel bodies including a lesser volume percentage of fuel particles may be made. When volume percentages above 30 percent are used, the structural strength of the matrix should be considered.

A suitable fuel body 13 can be extruded from coated fuel particles 53 that have been thoroughly dry-mixed with graphite powder having an average particle size of about 200 microns. The coated fuel particles 53 may be of any suitable size but preferably have an average diameter between about 500 microns and 900 microns, particles with an average diameter of about 700 microns being most preferred. A carbonizable binder material, such as ethylcellulose, and a suitable solvent for the binder, such as trichloroethylene, are used to prepare the green charge for the extruder. Standard extrusion techniques for graphite materials are used. After extrusion, the annular fuel body 13 is baked in an inert atmosphere, such as helium, at about 900° C. for ten hours, to drive off the solvent and carbonize the binder. After baking, the fuel body 13 is graphitized by heating to about 1800° C. or above for two hours or longer, thereby readying the fuel body 13 for use in a reactor.

Although the arrangement which places the fuel-containing graphite matrix 51 in direct contact with the reactor coolant stream provides excellent heat transfer, it has been found that heat transfer from the fuel element 11 to the coolant stream can be increased by roughening the outer surface of the annular fuel body 13. The roughened outer surface of the fuel body 13 creates localized turbulence in the coolant stream adjacent the fuel body 13, which turbulence reduces the heat transfer film loss, thus increasing the overall heat transfer efficiency.

Any suitable method of roughening the outer surface of the fuel body 13 may be used. To assure a uniformly improved heat transfer coefficient along the length of the fuel element 11, the outer surface is preferably uniformly roughened. It has been found that if a wrapping 59 of a fabric which is stable at high temperatures, such as graphite cloth, is affixed to the lateral surface of the fuel body 13 so that it becomes an integral part thereof, a uniformly roughened surface is provided which is stable at the operating temperatures of a high temperature gas-cooled reactor, e.g., about 500° to 1200° C. A suitable adhesive substance 61 having good thermal conductivity is used to secure the fabric to the fuel body 13. A carbonizable adhesive substance, such as coal tar pitch, is preferred for use with graphite cloth.

The wrapping 59 used is as thin as possible, consistent with the amount of turbulence desired, so that there is no significant heat transfer loss because of the wrapping. It has been found that woven graphite cloth having a thickness of about $\frac{1}{32}$ of an inch is suitable to produce the amount of turbulence desired. While, to some degree, a greater amount of turbulence results in still more efficient heat transfer, it also results in a larger pressure drop in the main coolant stream, a competing economic criterion in the overall reactor design. In balancing such criteria, a fabric having a thickness about $\frac{1}{32}$ inch is considered superior.

Although any alignment of the fabric on the graphite matrix 51 may be used so long as the lateral surface thereof is completely covered, preferably the woven fabric can most conveniently be applied with one of the sets of threads running laterally of the fuel element 11 and the other set running longitudinally thereof. If one set of threads is disposed parallel to the direction of flow of the main coolant stream (in the HTGR the direction of coolant flow through the core is axial to the fuel elements), the set of threads transverse to the flow are more important in creating turbulence. To assure turbulence in the desired range is created, woven fabric is applied which provides about 20 to about 30 threads per inch aligned in the direction transverse the coolant flow direction. If random orientation of the fabric upon fuel body is used, woven fabric is selected which has about 20 to about 30 threads per inch in both directions.

Although other suitable procedures may be used, the fuel body 13 having an outer roughened surface may satisfactorily be prepared by painting the lateral surface of the graphite matrix 51 with a thin layer of coal tar pitch 61 and then wrapping graphite cloth 59 thereabout. Finally, a second coat of coal tar pitch is applied which assures there is a firm and smooth bond between the threads and the graphite matrix 51. The fuel body 13 is then baked to carbonize the coal tar pitch 61 and affix the graphite cloth 59 to the graphite matrix 51 as an integral part of the fuel body 13.

In addition to uniformly roughening the surface of the fuel body 13, the graphite cloth wrapping 59 also protects the integrity of the coating 55 of the fuel particles 53. The coatings on the fuel particles 53 disposed at the outer surface of the fuel body 13 are vulnerable to abrasion, cracking, rupture, etc., during fuel element handling operations. The wrapping 59 overlies and protects these particles from physical damage. Furthermore, there is always the danger of chemical debilitation of these outermost particles by impurities which may get into the coolant stream, e.g., moisture resulting from a leak in the steam generator section of the coolant system. The wrapping 59 also protects the particles against such chemical attack.

The following example further illustrates one method of making a fuel element embodying various of the features of the invention, but is intended to in no way limit the scope of the invention which is defined in the appended claims.

*Example*

A generally cylindrical fuel element 11 of a type suitable for use in the HTGR, which uses helium as a coolant, is made having a 5 inch diameter, as measured along the fuel body 13. The top reflector 25 and bottom connector 27 are machined from cylindrical sections of reactor grade graphite. The spacing ring 43 is dimensioned to have a diameter of about 5.05 inches so that, when fuel elements 11 are assembled in a reactor core, the outer surfaces of the fuel bodies 13 of adjacent fuel elements will be spaced no closer than about 0.10 inch. The supporting spine 19 is machined from a tube of reactor grade graphite having an outer diameter of about 3.65 inches and a wall thickness of about 0.58 inch. About three-quarters of an inch of threads are cut on each end of the graphite tube, using 3½–12 UNC threads. Mating internal threads are cut on the sleeve portions 41, 47 of the top reflector and bottom connector.

The fuel body 13 is extruded using conventional extrusion techniques for graphite. The green extruder charge is made up of fuel particles 53, graphite, coal tar pitch and ethylcellulose powder. The fuel particles 53 contain approximately one part of uranium dicarbide to fifteen parts thorium dicarbide, coated with the aforementioned three-layer pyrolytic carbon coating 57. The fuel particles 53 have an average diameter of about 700 microns, including the coating thickness of about 100 microns. Reactor grade graphite having an average particle size of about 200 microns and ethylcellulose powder are used. The materials are used in the following ratios of parts by weight: coated fuel particles 30 parts; graphite powder 60 parts; coal tar pitch 9 parts; ethylcellulose powder one part. A total charge of 500 kg. is mixed for about 10 minutes in a P–K "Twin-Shell" blender of adequate capacity, until the particles are thoroughly intermixed and the fuel particles 53 are uniformly dispersed throughout the graphite.

After particle dispersion has been completed, trichloroethylene is added to the mixture in an amount of about one ml. per kg. of dry mixture. Mixing is resumed and continued until the solvent is dispersed throughout the mixture and the product has a uniform texture. The moist mixture is then charged into a ram-type extruder and is extruded using a die temperature of about 300° C. and a pressure about 15,000 p.s.i. The die is proportioned to create an annulus of graphite matrix fuel having an inner diameter of about 3.65 inches and an outer diameter of about 4.95 inches.

After extrusion, the annular fuel body 13 is baked in a helium atmosphere at about 900° C. for ten hours to drive off the volatiles and carbonize the ethylcellulose binder. The fuel body is then graphitized by heating to about 1800° C. for approximately two hours. Following graphitization, the annulus is cooled slowly to room temperature and is then painted with a thin layer of coal tar pitch. The painted surface is wrapped using WCB graphite cloth, a product of the National Carbon Company that has a thickness about 0.023 inch and a thread count of 24 threads per inch warp and 27 threads per inch weft. After wrapping with the warp threads parallel to the axis, another thin layer of coal tar pitch is painted over the graphite cloth, and the resultant product is baked for one hour at about 1500° C. The fuel body 13 is then cooled to room temperature and is ready for assembly.

A circular piece of graphite cloth is applied to the bottom face of the tubular graphite spine 19 and the center chamber 29 is filled with beryllium oxide powder. Vibration compaction is used to assure the chamber 29 is filled to capacity. Another circular piece of graphite cloth is applied over the top face of the tube 19. The bottom connector 27 is then screwed to the spine 17, and the fuel body 13 is carefully slid over the spine until it rests on the upper rim of the bottom connector. The top reflector 25 is assembled, and the fuel element 11 is ready for use in a nuclear reactor.

Preliminary tests of the fuel element 11 versus a fuel element of equivalent size and shape which contains an equivalent amount of nuclear fuel in the form of an annular fuel body of lesser diameter, but which is disposed within an outer, gas-impervious graphite sleeve about ⅜ inch thick, show that the same amount of heat is transferred to the coolant stream when the average fuel temperature of fuel element 11 is only about 1275° C. as when the average fuel temperature of the other fuel element is at about 1460° C. This comparison shows that the fuel element 11 has substantially improved heat transfer characteristics and can be advantageously used in high temperature gas-cooled nuclear reactors. The fuel element 11 is considered well-suited for use in a high temperature graphite-moderated nuclear reactor using a helium coolant stream.

Various of the features of the invention are set forth in the following claims.

What is claimed is:

1. In a nuclear reactor utilizing a fluid coolant stream to extract the heat therefrom, an elongated fuel element adapted to be disposed axially to the direction of coolant flow, which fuel element comprises an elongated annular fuel body including discrete fuel particles dispersed within a graphite matrix, said fuel particles having centers containing nuclear fuel material which centers are individually coated with fission-product-migration-resistant coatings, said coatings being effective to retain therewithin at least about 99 percent of the fission products resulting from fissions of said nuclear fuel material, and means connected to said fuel body for positioning said fuel body in the core of the nuclear reactor so that the elongated outer surface of said graphite matrix is in direct contact with the axially flowing fluid coolant stream, said fuel body also including woven graphite cloth affixed to said outer elongated surface of said graphite matrix which graphite cloth contains between about 20 and 30 threads per inch aligned in the direction transverse to the coolant flow, said fabric uniformly roughening said surface so that localized turbulence is created in the coolant stream adjacent said surface whereby heat transfer between the fuel element and the coolant stream is substantially improved.

2. In a high-temperature nuclear reactor utilizing a gas coolant stream to extract the heat therefrom, an elongated fuel element adapted to be disposed axially to the direction of coolant flow, which fuel element comprises an elongated annular fuel body including discrete fuel particles in an amount of about 30 volume percent dispersed within a graphite matrix, said fuel particles having an average diameter of about 700 microns and having centers containing nuclear fuel material which centers are individually coated with fission-product-migration-resistant pyrolytic carbon coatings, said coatings being effective to retain therewithin at least about 99 percent of the fission products resulting from fissions of said nuclear fuel material, and means passing through the center of said annular fuel body for positioning said fuel body in the core of the nuclear reactor so that the elongated outer surface of said graphite matrix is in direct contact with the axially flowing fluid coolant stream, said fuel body also including woven graphite cloth affixed to said outer elongated surface of said graphite matrix which graphite cloth contains between about 20 and 30 threads per inch in the direction along said surface generally parallel to the direction of coolant flow, said fabric uniformly roughening said surface so that localized turbulence is created in the coolant stream adjacent said surface whereby heat transfer between the fuel element and the coolant stream is substantially improved.

3. In a nuclear reactor utilizing a fluid coolant stream to extract the heat therefrom, a fuel element which comprises a fuel body including nuclear fuel particles dispersed within a ceramic matrix, means connected to said fuel body for positioning said fuel body in the core of the nuclear reactor so that an outer surface of said fuel body is in direct contact with the fluid coolant stream, and a thin fabric made of discrete threads affixed to said outer surface of said fuel body, which fabric uniformly roughens said surface so that localized turbulence is created in the coolant stream adjacent said surface, substantially improving heat transfer between the fuel element and the coolant stream.

4. In a nuclear reactor utilizing a fluid coolant stream to extract the heat therefrom, a fuel element which comprises a fuel body including nuclear fuel particles dispersed within a ceramic matrix, means connected to said fuel body for positioning said fuel body in the core of the nuclear reactor so that an outer surface of said fuel body is in direct contact with the fluid coolant stream, and a thin fabric made of discrete threads having about 20 to 30 threads per inch affixed to said outer surface of said fuel body, which fabric uniformly roughens said surface so that localized turbulence is created in the coolant stream adjacent said surface, substantially improving heat transfer between the fuel element and the coolant stream.

5. A fuel element for a nuclear reactor which fuel element comprises an elongated fuel body including discrete fuel particles dispersed within a graphite matrix, said fuel particles having centers containing nuclear fuel material which centers are individually coated with fission-product-migration-resistant coatings, and means connected to said fuel body for positioning said fuel body in the core of a nuclear reactor with said fuel body located so that an outer surface of said graphite matrix is in direct contact with the reactor coolant stream, said fuel body also including a fabric made of discrete threads affixed to said outer surface of said graphite matrix which fabric uniformly roughens said surface so that localized turbulence is created in the coolant stream adjacent said outer surface substantially improving heat transfer between the fuel element and the coolant stream.

6. In a nuclear reactor utilizing a fluid coolant stream to extract the heat therefrom, an elongated fuel element adapted to be disposed axially to the direction of coolant flow, which fuel element comprises an elongated fuel body including nuclear fuel particles dispersed within a ceramic matrix, means connected to said fuel body for positioning said fuel body in the core of the nuclear reactor so that an elongated outer surface of said ceramic matrix is in direct contact with the axially flowing fluid coolant stream, and woven graphite cloth affixed to said outer elongated surface of said ceramic matrix which graphite cloth contains between about 20 and 30 threads per inch aligned in the direction generally transverse to the direction of coolant flow, said fabric uniformly roughening said surface so that localized turbulence is created in the coolant stream adjacent said surface whereby heat transfer between the fuel element and the coolant stream is substantially improved.

7. In a high-temperature nuclear reactor utilizing a gas coolant stream to extract the heat therefrom, an elongated fuel element adapted to be disposed axially to the direction of coolant flow, which fuel element comprises an elongated fuel body including nuclear fuel particles dispersed within a graphite matrix, means connected to said fuel body for positioning said fuel body in the core of the nuclear reactor so that an elongated outer surface of said graphite matrix is in direct contact with the axially flowing coolant stream, and woven graphite cloth affixed to said outer elongated surface of said graphite matrix which graphite cloth contains between about 20 and 30 threads per inch in each direction, said fabric uniformly roughening said surface so that localized turbulence is created in the coolant stream adjacent said surface whereby heat transfer between the fuel element and the coolant stream is substantially improved.

References Cited by the Examiner
UNITED STATES PATENTS

| | | | |
|---|---|---|---|
| 2,894,891 | 7/1959 | Grebe | 176—90 |
| 2,983,658 | 5/1961 | Hyman et al. | 176—90 |
| 3,028,330 | 4/1962 | Justheim et al. | 176—90 |
| 3,039,947 | 6/1962 | Fortescue et al. | 176—37 |
| 3,135,665 | 6/1964 | Koutz et al. | 176—90 |
| 3,151,037 | 9/1964 | Johnson et al. | 176—91 |
| 3,154,141 | 10/1964 | Huet | 165—185 |
| 3,158,547 | 11/1964 | Smith | 176—90 |

REUBEN EPSTEIN, *Primary Examiner.*

CARL D. QUARFORTH, L. DEWAYNE RUTLEDGE,
*Examiners.*